(12) United States Patent
Khoury

(10) Patent No.: US 6,849,844 B2
(45) Date of Patent: Feb. 1, 2005

(54) 2-D MICROSCOPIC TOMOGRAPHIC SYSTEMS UTILIZING 2-D DEFLECTION SENSORS

(76) Inventor: Jed Khoury, 33 Tanbark Rd., Sudbury, MA (US) 01776

(*) Notice: Subject to any disclaimer, the term of this patent is extended or adjusted under 35 U.S.C. 154(b) by 218 days.

(21) Appl. No.: 09/974,164

(22) Filed: Oct. 9, 2001

(65) Prior Publication Data

US 2002/0057757 A1 May 16, 2002

Related U.S. Application Data

(60) Provisional application No. 60/239,834, filed on Oct. 12, 2000.

(51) Int. Cl.[7] .............................................. H01L 27/00
(52) U.S. Cl. ............................... 250/208.1; 250/363.04
(58) Field of Search ........................ 250/208.1, 214 R, 250/216, 363.02, 363.04; 359/9, 11, 15, 17, 22, 29, 32; 382/210, 214, 254, 260, 263

(56) References Cited

U.S. PATENT DOCUMENTS 6,262,818 B1 * 7/2001 Cuche et al. .................. 359/9

* cited by examiner

Primary Examiner—Que T. Le
(74) Attorney, Agent, or Firm—Robert Nathans

(57) ABSTRACT

A high resolution, non-scanning system for microscopy and/or tomography whereby a broad non-focused input image transmitted through a medium such the human body is processed, in contrast with a focused scanning beam. A high pass filter provides high sensitivity, and a high magnification feedback loop magnifier having reduced lens aberrations is also provided. A zoom lens focuses the input image such as a tumor at different planes within the medium. Image processing systems for correction via a back-propagation algorithms followed by a two-dimensional (2-D) deflection sensor and a 2-D Demultiplexer is employed to produce separate phase and amplitude image signals that are then mixed and applied to a display yielding three dimensional tomographic images. Novel two demultiplexers for calculation amplitude and phase images are disclosed based on a smart pixelated array, a tunable grating, and a two-probe beam hologram, each beam having two different wavelengths or two different modulations.

Figure 1:
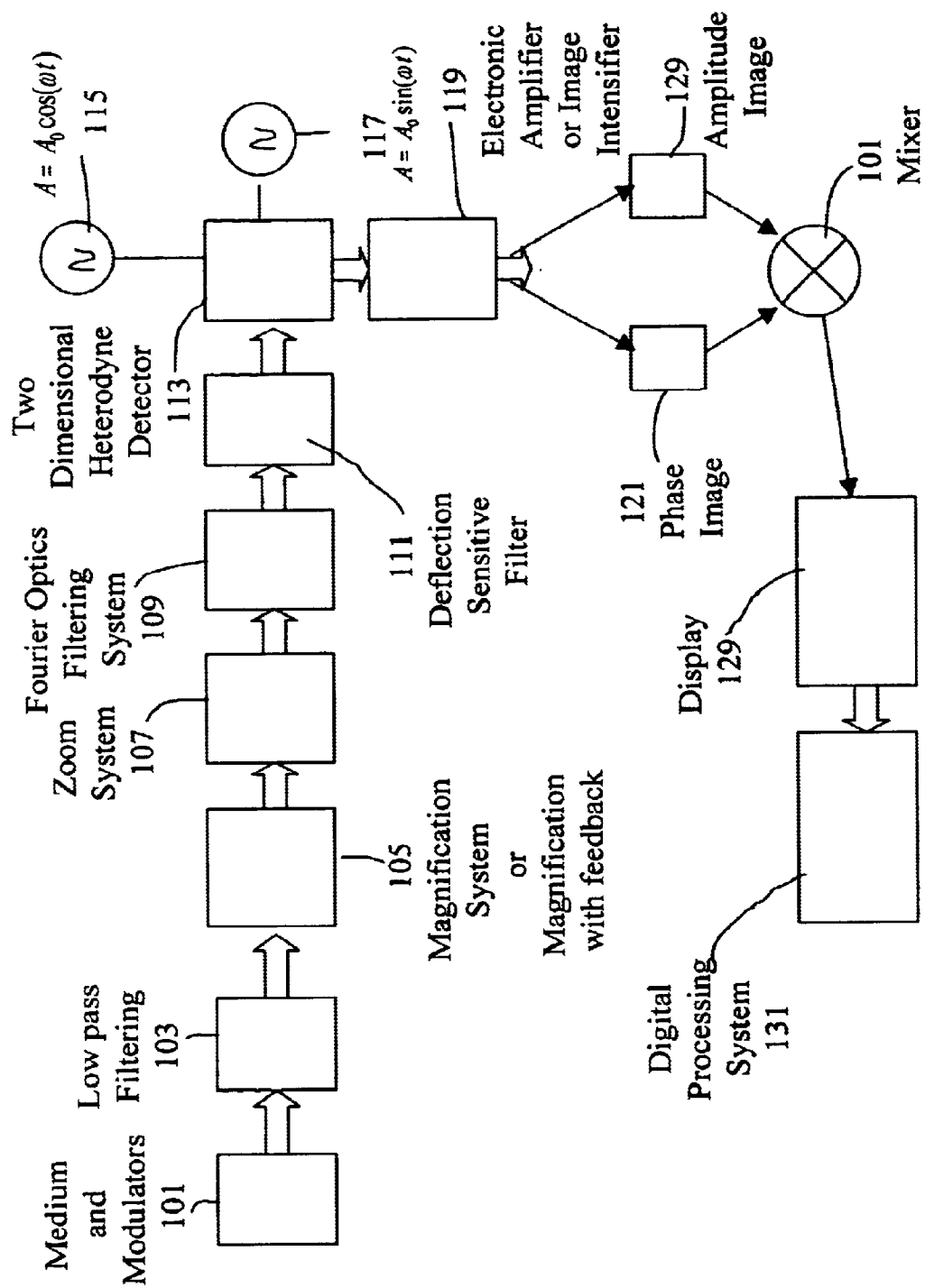

37 Claims, 7 Drawing Sheets

2-D MICROSCOPIC TOMOGRAPHIC SYSTEMS UTILIZING 2-D DEFLECTION SENSORS

REFERENCE TO RELATED APPLICATION

This application claims the benefit of provisional application No. 60/239,834 filed Oct. 12, 2000.

BACKGROUND OF THE INVENTION

For several decades microscopy and tomography were designed using scanning approaches; see Theodore George Rochow and Eugene George Rochow, "*An introduction to microscopy by, means of light, electron, X ray, or ulrasound*" Plenum Press, 1978. This made acquiring the data on a pixel by pixel basis a time consuming process. For many industrial applications this can be very costly.

The general feature which unifies all microcopies and tomographies, is a modulated or pulsed focussed pencil probe beam that is detected and sent to deflection sensor then demultiplexer (time, heterodyne) to extract the required information for building the image See Kyuman Cho, David L. Mazzoni and Christopher C. Davis, "*measurement of local slope of a surface by vibrating-sample heterodyne interferometry: A new method for scanning microscopy. Optics Letters*, Vol. 18 Issue 3 Page 232, T. Sawatari *Optical heterodyne scanning microscope. Appl. Opt.* 12, 2768–2772 (1973).

A significant part of the scientific and industrial community has been attempting to improve the performance within these lines of design. Some scientists proposed using several beams focused into the sample utilizing a lens array; Martin Schrader, Rainer Pick, Stefan, W. Hell "*New development in 4Pi-microscopy*", OSA meeting, 1998, Paper WM3.

Others utilized the possibility of focusing an array of diode lasers into the sample; Even though there was a significant reduction in the data acquisition time, these approaches were not applicable with ultra high-resolution microscopes such as atomic force microscopes; see H. Kumar Wickramasinghe. *Scanned-probe Microscopes "Scientific American"*48–55. and near field microscopies; E. Betzing, J. K. Trautman, J. S. Weiner, T. D. Harris and R. Wolf, *Polarization contrast in near-field scanning optical microscopy, Appl. Opt.* 4563–4568, (1992).

The present invention a general purpose optical microscopic-tomographic system proposed here is based on using different form of 2-D image multiplexer for performing 2-D image data acquisition. The 2-D image multiplexer can be 2-D homodyne heterodyne detection, 2-D time-division demultiplexing, 2-D wavelength division demultiplexing or any combination This system can be cascaded with many microscopies and tomographic systems. This includes Doppler X. J. Wang, T. E. Milner and J. S Nelson, "*Charactarization of fluid flow velocity by optical Doppler tomography,*" Opt. Letts.20, 1337 (1995), photon density J. B. Fishkin, E. Gratton, *J.Opt.Soc.Am.A.* 10. 127–140 (1993)., phothermal Amer, N. M. J. Phys (Paris) Colloq. C6, 185, ultrasonic Clavin F. Quate, "*The acoustic Microscope,*" Scientific american, 31–39, surface profilometry. Kyuman Cho, David L. Mazzoni and Christopher C. Davis, "*measurement of local slope of a surface by vibrating-sample heterodyne interferometry: A new method for scanning microscopy. Opt. letts.*, and atomic force microscopy H. Kumar Wickramasinghe. *Scanned-probe Microscopes "Scientific American,* 48–55.

The present invention provides new systems that are the first non-scanning systems which has potential for data acquisition at speeds even faster than camera frame speeds. Further, because the system uses a plane wave for probing the media and does not use a focused beam, this means that the resolutions are not limited by the focusing ability of the lens as in conventional microscopes; see Theodore George Rochow and Eugene George Rochow, "*An introduction to microscopy by, means of light, electron, X-ray, or ulrasound*" Plenum Press, 1978; or the sharpness of the tip in near field microcopies; see H. Kumar Wickramasinghe. *Scanned-probe Microscopes "Scientific American,* 48–55. Hence present invention system has a potential for attaining as high a resolution as near field microscopy http://www.research.ibm.com/research/press/optical1.html., This feature assumes that appropriate optical design has been done to overcome the aberration of lenses. To overcome the aberration from high magnification, a feedback magnification system is introduced. The magnification in each loop should be made small to avoid aberration. Through feedback of the inputs several times a high magnification is achieved. Further a specific implementation based on volume Bragg grating can also remove a certain portion of the aberration and hence the resolution can be improved. This feature applies for both scanning and non-scanning systems.

Because the new system of the present invention operates in parallel, this opens the possibility of using a Fourier optical processor for optical system aberration correction and medium turbulence compensation. Also, getting rid of the unmodulated portions of the light, opens the possibility for very high sensitive microscopy-tomography., a problem which faced other researchers in this area; see Thomas C. Hale, Kenneth L. Telschow and Vance A. Deason., "*Photorefractive optical lock-in vibration spectral measurement.,*" *Appl. Opt.* 36, 8248–8257 (1997); Kyuman Cho, David L. Mazzoni and Christopher C. Davis, "*measurement of local slope of a surface by vibrating-sample heterodyne interferometry: A new method for scanning microscopy. Optics Letters*, Vol. 18 Issue 3 Page 232.

Numerous forms of 2-D image demultiplexers can be used for this application. However, we are going to describe some of the preferred designs. The first proposed design is based on smart pixilated structure, the second is based on demultiplexing light with a reference signal via a tunable Bragg grating. The third is simply an image intensifier with modulated gain. (U.S. Pat. No. 5,213,105 by Gratton, et, al), The fourth is CCD camera which acts as electronic hologram, and the fifth is based on using a demultiplexer of real-time holographic media. See for example J. Khoury, V. Ryan C. L. Woods and M. Cronin-Golomb "*Photorefractive optical lock-in detector,*" Opt. Letts, 16, 1442–1444, 1991.

Many communities will benefit from this design: (1) the microelectronic community in accelerating the process of checking wafers and electronic chips, (2) the medical community in tomographic applications for detecting tumors in abnormal tissues.(3) The biological community (4) the automobile and other industrial communities.

SUMMARY OF A PREFERRED EMBODIMENT OF THE INVENTION

A high pass optical filter having a Fourier transform lens coupled to a DC blocking member, receives the output of a modulator for modulating an input image introduced into the system, and for applying a broad, non-focused modulated signal image to the high pass filter.

A zoom lens is provided to enable viewing of selected slices of a three dimensional object image such as a tumor. An image magnification device having a feedback loop is coupled between the high pass optical filter and the zoom lens and a deflection sensitive filter. The deflection sensitive filter is optionally provided for encoding a phase map for certain applications of tomography. A Fourier optics filter is coupled between the zoom lens and the deflection sensitive filter addressed via the back propagation algorithm for distortion compensation.

A two dimensional demultiplexer receives output signals from the deflection sensitive filter, and a calculating device is coupled to the demultiplexer for calculating separate phase images and amplitude images. An image mixer is also provided for mixing the separate phase images and amplitude images and an image display device is coupled to the mixing means for displaying images having both phase and amplitude information.

DESCRIBTION OF THE DRAWINGS

The various features of the invention will become apparent upon study of the following description taken in conjunction with the drawing which:

FIG. 1 shows the generalised system for hetrodyne optical microscopy and tomography.

Figure 2:
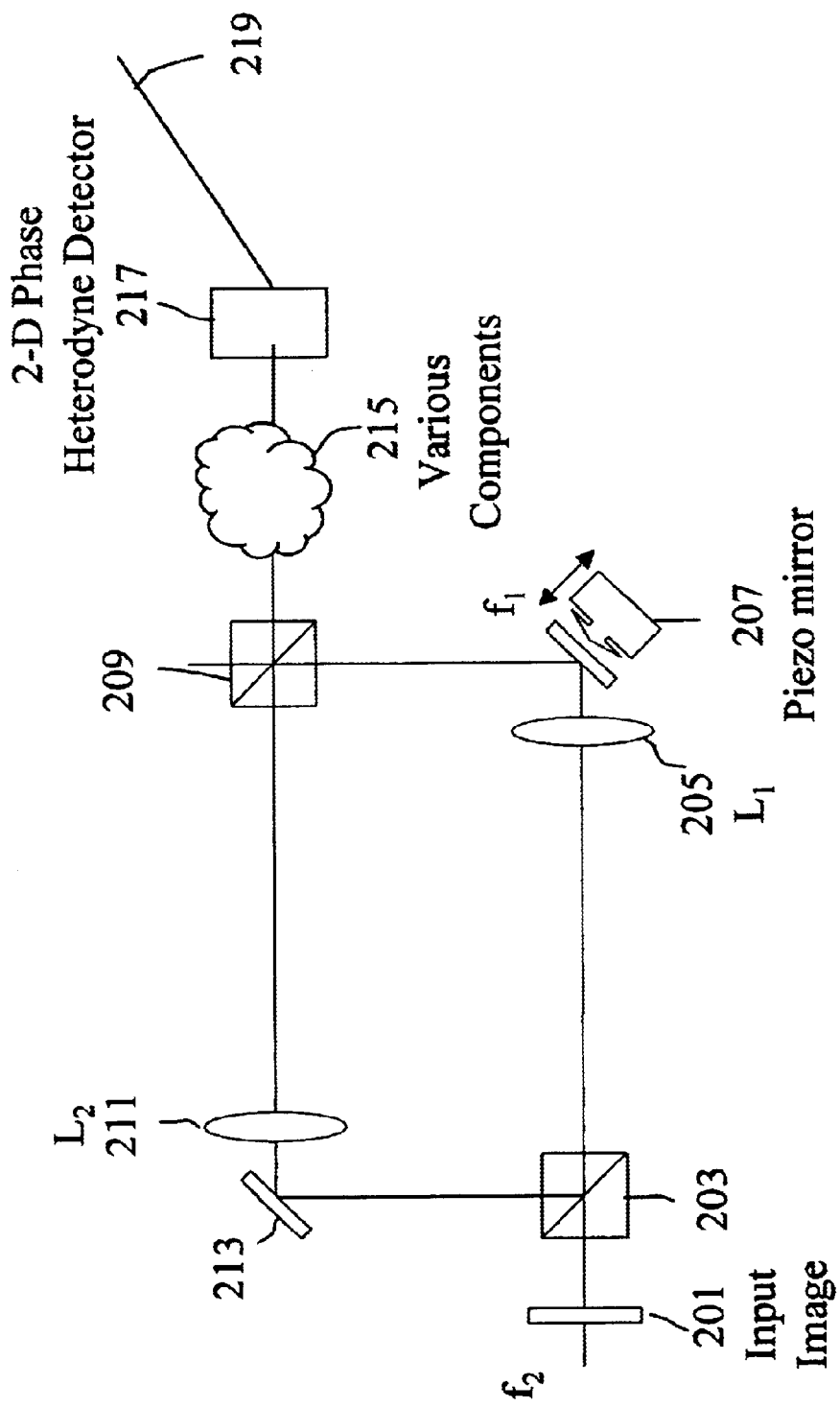

FIG. 2: Feedback magnification loop

Figure 3:
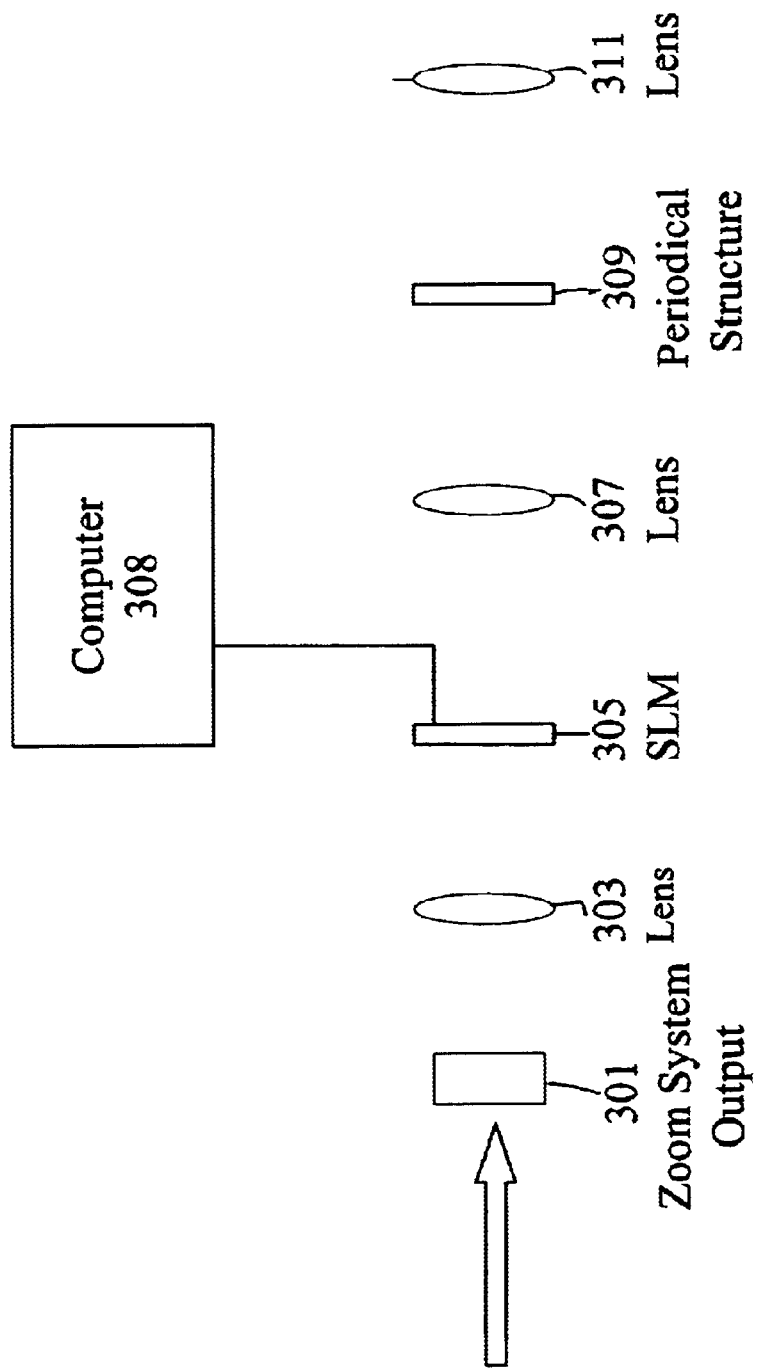

FIG. 3: Optical processing system couples an out put from a zoom lens to a Fourier optics based spatial filtering to deflection sensing detector.

Figure 4:
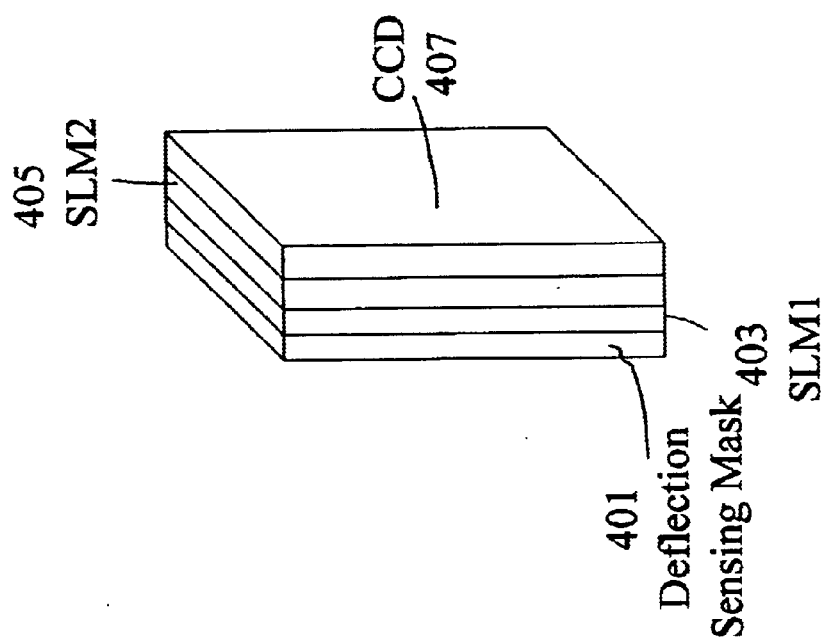

FIG. 4: A layered structure of smart pixels array for microscopy and tomography

Figure 5:
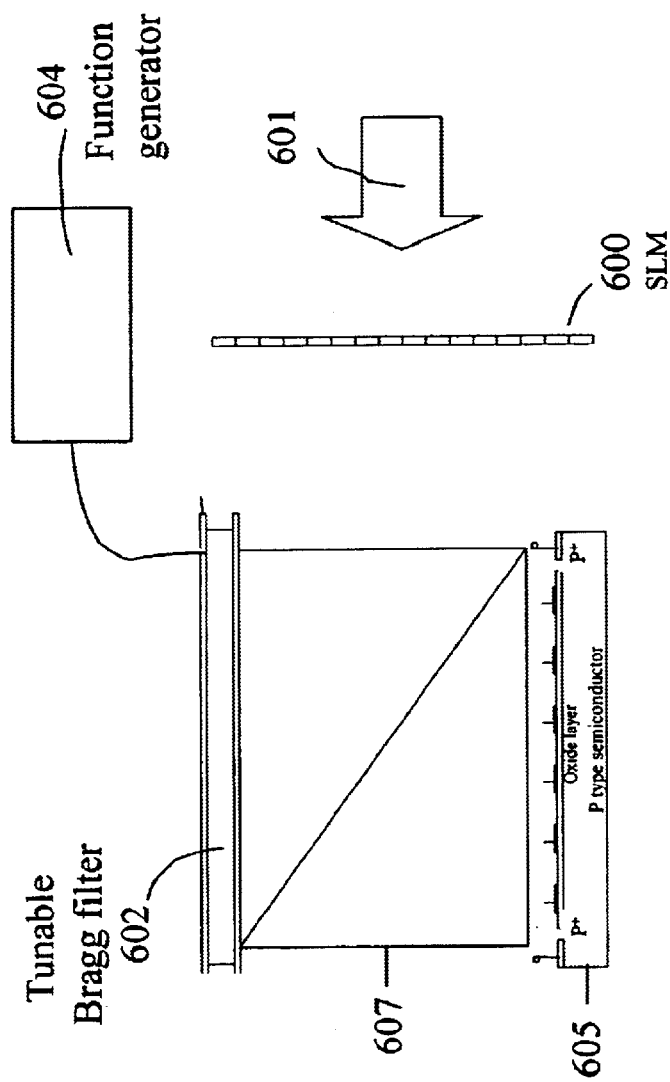

FIG. 5: Schematic diagram illustrates a demultiplexer (hetrodyne or TDM)via a holographic tuneable filter coupled to deflection sensing detector.

Figure 6:
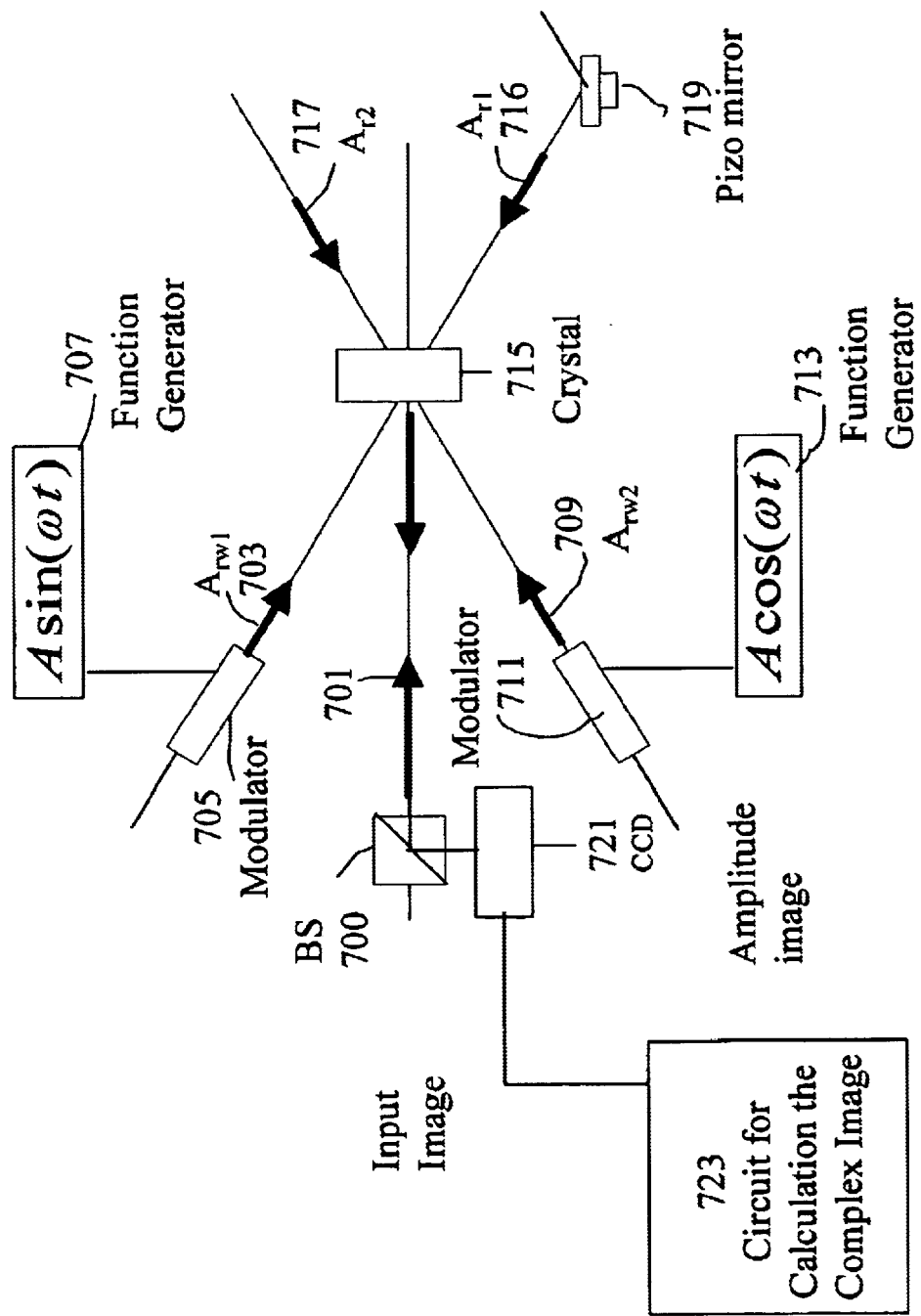

FIG. 6: Holographic tomographic image construction scheme via six-wave mixing arrangement.

Figure 7:
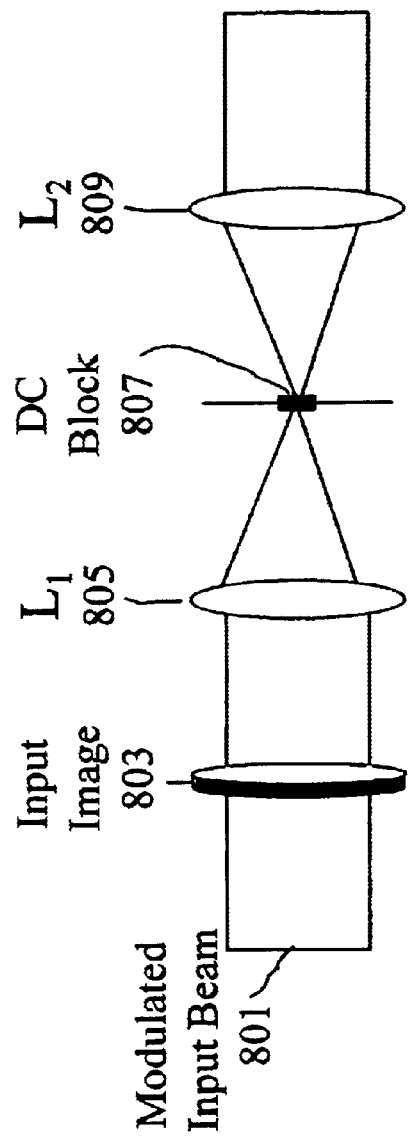

FIG. 7: Fourier optics based high-pass filtering scheme.

DETAILED DESCRIPTION OF EMBODIMENTS OF THE INVENTION

This invention can be implemented using all forms of 2-D image demuliplexer, however first it is going to be illustrated using 2D homodyne image demultiplexer. FIG. 1 shows the generalized system for homodyne optical microscopy and tomography. The broad, non-focused modulated signal image output from the medium, represented by block 101, passes through a high pass optical filtering system 103 (essentially a Fourier transform lens with DC block shown in FIG. 8) to improve the sensitivity of the system. This feature is very important for very high sensitivity. Then the signal is inputted into a magnification system 105. This magnification system can be simply a lens, microscopic system, or lithographic system which operates in backward propagation architecture. However, for achieving very high magnification, the magnification system can be modified to a feedback magnification loop; see Joby Joseph, Takayasu Oura and Takumi Minemoto, "*Optical implemenation of wavelet transform by the use of the dynamic of holographic recording in photorefractive media,*" *Appl. Opt.* 34 (3997–4003) 1995. This innovation was used in reducing the scale factor in wavelet transforms and was not used in time division demultiplexers. As shown in FIG. 2, in this feedback loop, through the transmission of the input image 201, each feedback process is associated with Doppler shift $f_2$ via the piezo mirror 207 and magnification lenses 205 and 213. Thus the output from BS 209 consists of the input image with different magnifications. These different magnifications can be demultiplexed using any of the later described two-dimensional homodyne and heterodyne detectors. For achieving a magnification of Mn (M being the magnification of the system, n is the number of feedbacks), it is essential that the reference modulation beam 219 of the homodyne heterodyne detector 217 in FIG. 2 (or the modulators 115 and 117 of component 113 in FIG. 1 for the homodyne heterodyne detector) be tuned to the frequency of $\omega_1+n\omega_2$, where $\omega 1$ is the modulation frequency of the beam 101 existing out of the medium, and $\omega_2$ is the Doppler shift of the light through one transmission with the feedback magnification loop. Component 215 in FIG. 2 essentially includes the three components 107, 109 and 111 in FIG. 1. Magnification system 105 is needed for microscopy and may be less important for tomography.

After the light signal is magnified by unit 105, it is transmitted through a Zoom system 107. The purpose of the zoom system is to focus the input at different planes within the medium. This is important to reconstruct the nature of the three-dimensional object such as a tumor. The Zoom system, familiar to workers in the art, is generally required for both microscopy and tomography applications of the invention, and can be simply a set of lenses, or an electro-optic lens with variable focal length, or an optically addressed spatial light modulator addressed by circular fringes. The output from the zoom system is filtered by a Fourier optics system 109 which can be positioned as shown in FIG. 1 or can be provided instead in the digital processing system 131.

As shown in FIG. 3, the light is transmitted out of zoom system 301, and then Fourier transformed via lens 303 into the spatial light modulator 305. This spatial light modulator is addressed via a computer 308 providing the back propagation algorithm that is provided in order to deconvolve the image from turbulence through propagation in the medium. The back propagation algorithm is dependent on the brand of waves used in microscopy or tomography. The back propagation algorithm mentioned below, is known in the art in connection with ultrasonic microscopy; see Richard Y. Chiao and Hua Lee, "*Implementation of the scanning tomographic acoustic microscope for multiple-angle tomography*" (499, 509) (*Acoustical Imaging*) *Volume* 19 Edited by Helmut Ermert and Hans-Peter Harjes (1991).

As shown in FIG. 3, after the information is filtered by the SLM 305, which is addressed via computer 308 by the back-forth propagation beam 308 algorithm, it is again filtered by a deflection sensing filter 111 as in FIG. 1. The deflection sensing filter, as illustrated in FIG. 3, consists of a Fourier transform lens 307 followed by a periodical structure 309 such as a checkerboard or Bragg grating filter. This deflection sensing filter may be desired for some applications of tomography such as ultrasonic tomography, and for atomic force microscopy. For example, in scanning ultrasonic microscopy to determine the amplitude and phase of the ultrasonic wave which reaches the sample, both can extracted from the deviation of the optical wave from its normal direction utilizing a knife edge as a partial beam block for deflection sensing.

In two dimensional microscopy, the checkerboard functions as a deflection sensing detector as follows: the "checkerboard" is a micro-array of members functioning as an array of knife edges. The tiny knife edges convert slight angular shifts of beamlets directed at the knife edges into intensity varying signals, the changing amplitude of such signals being proportional to the angular paths of the beamlets projected at the micro-knife-edge members in the array. Each micro-knife edge member in the novel array of members acts like a conventional knife edge to perform sensing to beam deflection. Therefore, the distribution of the light intensity after its transmission through the deflection sensing detector is going to determine the amplitude image. If the medium under test is not absorptive and does not introduce an aberration in the wave, the wave reaches the sample surface, and the resultant output of the phase sensing detector is essentially the mixed amplitude phase image. If the medium under testing is absorptive and abberative then it is necessary to perform two mixings with two different signals which have two different phases in order to extract the amplitude and the phase images; see units 115 and 117, FIG. 1. In other kinds of microscopes such as those using photon diffusion deflection sensing, it is not essential to use a deflection sensing detector.

After the light is transmitted or reflected from the deflection sensing detector, then it is imaged by lens 311 (FIG. 3) upon a two-homodyne heterodyne detector 113 (or any demultiplexer) in FIG. 1. The 2-D homodyne heterodyne detector can be selected from one of the following:

(1) An array of smart pixilated array involving a knife edge prior to the photodiode, processing circuit involved mixers and a quadrature circuit for calculating both the phase and the amplitude images. See Richard Y. Chiao and Hua Lee, "*Implementation of the scanning tomographic acoustic microscope for multiple-angle tomography* (499 509) (*Acoustical Imaging*) Volume 19 Edited by Helmut Ermert and Hans-Peter Harjes (1991)) In two dimensional structure, the knife edge should be replaced with a periodical structure such as checkerboard or grating.

(2) The combination of a tunable Bragg filter with 2-D time integrative device, to be described in FIG. 6 herein. This homodyne heterodyne detector (or demultiplexer) can also act as a deflection sensing detector (See pending Khoury utility patent application Ser. No. 09/642,204, filed 19 Aug. 2000 entitled "Hetrodyne-Wavelength Division Demultiplexing").

(3) Image intensifier with external gain modulation (4) CCD array (most conventional approach); or (5) Holographic demultiplexer operating in any form of wave mixing, e.g. two-wave mixing, four-wave mixing; function as heterodyne detector; see the aforesaid Khoury et al., U.S. Pat. No. 5,303,031 for heterodyne detection as time gate or TDM see S. C. W. Hyde, N. P. Barry, R. Jones, J. C. Dainty, P. M. W. French, M. B. Klein, B. A. Wechsle, "*Depth-resolved holographic imaging through scattering media by photorefraction,*" *Optics Letters,* Volume 20, Issue 11, 1331-June 1995.

In order to realize tomography with its important three dimensional (3-D) attribute, it is essential to measure both the amplitude and the phase images. One way to realize this is to perform homodyne heterodyne detection with two reference signal generators, preferably one with sine phase modulation 115 and the other with cos phase modulation 117. The output from 2-D homodyne heterodyne detector 113 is preferably amplified via electronic or image intensifier 119. From both these measurements it is well within the skill of the worker in the art to build an electronic circuit block 120 in FIG. 1, which has two outputs, to calculate in real time both the phase image 121 and the amplitude image 129. Richard Y. Chiao and Hua Lee, "*Implementation of the scanning tomographic acoustic microscope for multiple-angle tomography* (499 509) (*Acoustical Imaging*) Volume 19 Edited by Helmut Ermert and Hans-Peter Harjes (1991)).

Both the amplitude the phase images are then mixed together by mixer 127 OF FIG. 1, and then sent to display system 129 to produce a 3-D in depth image 3-D suitable for tomography and then to image processing system 131 to perform image enhancement. The output of the 2-D homodyne heterodyne detector detector can be amplified electronically for the aforesaid opto-electronic smart pixel embodiment, or can be amplified optically through an image intensifier in the aforesaid embodiment of holographic homodyne heterodyne detector detection, or Bragg grating based phase sensitive detector.

In general the purpose behind mixing with two-reference signals, is to generate two equations with two variables (phase and amplitude), then an analogue circuit or digital circuit solves these two mathematical equations. The two reference beams can be any two beams with arbitrary phases, However, for design simplification it is better for one of the reference signals to involve sin and the other to involve cos modulation. Also one might think of other alternative approaches for calculating the phase and the amplitude images. For example, one might use a probe beam with two different wavelengths, then from the measurement with two wavelengths it is possible to calculate the amplitude and the phase images. However for such a design it is better to utilize 2-D attribute WDM, or combine the design of WDM with heterodyne detection as taught in my pending patent application, Ser. No. 09/642,204.

Regarding 2-D opto-electronic implementation of demuliplexer for tomographic applications, FIG. 4 shows a new compact design of a 2-D opt-electronic demuliplexer for microscopic tomographic applications. This design consists of the aforesaid deflection sensitive mask 401 including SLM1 403 followed by SLM2 405, coupled to CCD array 407. The deflection sensitive mask can be a two dimensional periodical structure such as a checkerboard, 2-D array of holes or Bragg filter gratings. SLM is addressed via aback propagation algorithm for distortion correction. SLM2 can be an array of detectors coupled at least to one mixing circuit and analogue or digital circuit for calculation phase and amplitude images, then of a CCD for the purpose of display.

This design approach is fairly complex and may result in image resolution degradation due to limitations of current VLSI technology, Therefore I would like to introduce new technology which can overcome these limitations. The new technology is based on tuneable cells which use volume Bragg gratings.

Also as I mentioned previously, this design can be manipulated utilizing two-probe beams with two different wavelengths or in a more general way with muliwavelenghts. In this case the periodical structure can be made to operate also as a wavelength division demultiplexer. The array of detectors is replaced with an array of two detectors or multi detectors (a detector for each wavelength) and the outputs from each detector are mixed with a reference modulation signal to calculate the amplitude and the phase images.

Bragg Grating-2D Time Integrative Device Homodyne Heterodyne Detector

The previous homodyne heterodyne detector for tomographic application has a limited resolution. This is because the detection and the processing are combined on the same location as the integrated structure. This means that this detector has limited use for applications, which require high resolution. On the other hand the holographic technology is not always easy to keep the components aligned and stable.

Therefore, I am proposing a new homodyne heterodyne detector (or demultiplexer) which is based on the combination of a tuneable holographic filter with a 2-D time integrative device. This approach is the subject of my aforesaid pending patent application. FIG. 5 shows a schematic diagram of this new homodyne heterodyne detector (or demultiplexer). In this new scheme, light is incident on a holographic tuneable filter 602, which is driven via function generator 604. This light, bearing the input signal, either reflected or transmitted, depends on the filter type. When the input light is modulated, essentially this will cause a Doppler shift of the incident light (or very small shift in the incident light wavelength). As is well known from standard holography, any change in Bragg matched conditions (alignment or wavelength) should change the transmissivity or the reflectivity of the Bragg filter. Suppose now this filter is modulated through any one of the well-known tuning effects (Electro-optic, thermal, elasto-optic, acousto-optic), then maximum transmissivity, or reflectivity of the Bragg filter occurs when the input light modulation is in phase with the tuning source applied on the Bragg filter. If the output is cascaded with a time integrative device such as CCD 605 camera then homodyne heterodyne detector (or demultiplexer). signals are recorded. For performing tomography, it is possible to use other approaches used in other tomographeies, e.g. one time slot to modulate the Bragg filter with sin modulation, and another time slot to modulate the Bragg filter with cos modulation. From these two subsequent measurements it is possible to measure both the amplitude and the phase images.

Thus, the new homodyne heterodyne detector (or demultiplexer). uses tuneable a Bragg filter cascaded with a time integrative device, However, because a Bragg filter is also sensitive to the orientation of the incident beam. This makes the new device not only function as a homodyne heterodyne detector (or demultiplexer). but also function as an orientation or deflection sensitive detector in 2-D. Therefore, for example, if such a homodyne heterodyne detector (or demultiplexer) is cascaded in optical microscopy, then there is no need for the aforesaid knife edge checkerboard. High sensitivity for orientation is achievable using a Bragg filter in reflection geometry, or relatively thick Bragg filter. For very high sensitivity it is better to use a chirped Bragg grating. A fixed tuneable holographic grating can also be replaced with an acoustooptic Bragg grating.

Also as I mentioned this design could be manipulated utilizing multi-probe beams with muli-wavelengths. In this case the Bragg grating can be made to operate simultaneously as WDM and heterodyne detectors. From measurement in different wavelengths it possible to calculate computationally or through special design of electronic circuits the phase and the amplitude images.

Real-time Hologram can acts as a heterodyne detector, this because the interfering beam on the hologram are basically mixed signal, the finite response time for writing the hologram is origin of band bass filtering. Mixing and band pass filtering are the essential operations with any homodyne heterodyne based device. *Application of photorefraction to non-linear information processing techniques* (J. Khoury, Ph.D theses 1989). J. Khoury, V. Ryan C. L. Woods and M. Cronin-Golomb *"Photorefractive optical lock-in detector,"* Opt. Letts, 16, 1442–1444, 1991.

For performing tomography with real-time holography it is necessary to use two holograms one with sine modulates wave and the other with a cos modulate wave. However, more elegant design it can be based on using one real-time hologram with two mixing reference beams. FIG. 6. shows a six wave mixing arrangement (See N. A. Vainos, R. W. Eason. Opt. Commun, 62,311 (1987)) for a related holographic tomographic image construction. In this configuration, the input probe beam 701 (object beam) $A_O$ interferes with two reference beams $A_{rw1}$ 703 which is sine modulated by the modulator 705 driven by the function generator 707 and $A_{rw2}$ 709 modulated by cos modulation via the modulator 711 driven by the function generator 713 on the crystal 715 (real -time holographic media). Two gratings are written on the crystal, one grating is generated via the interference between Ao 701 and $A_{rw1}$ 703 and other grating is generated as result of the interference between Ao 701 and $A_{rw2}$ 709. Two read out beams are available in this arrangement $A_{r1}$ 715 counter propagating $A_{rw1}$ 703, and $A_{r2}$ 717 counter propagating to $A_{rw2}$ 709, the phase of $A_{r1}$ 716 is adjusted via piezo mirror 719. Thus, two simultaneous phase-conjugate beams are generated, one by reading the grating of $A_{rw1}Ao$ by $A_{r1}$ and the other by reading the grating of $A_{rw2}A_0$ by $A_{r2}$. Both the phases' conjugates overlap and propagate back through beam splitter 700 to the CCD 721.

Both the phase conjugates include information about the phase and amplitude of the probe beam. Let us assume that the outputs from the two phase conjugates beam are proportional to $A_{rw1}A_0 \cos \phi$ and $A_{rw2}A_0 \sin \phi$ respectively. If we adjust our setup such that $A_{rw1}=A_{rw2}=A_r$, then it possible to adjust by the piezo-mirror in $A_{rw1}$ so that the resultant phase-conjugate beam is in constructive mode $$A_o A_r \cos\phi + A_o A_r \sin\phi$$

$$A_o A_r \cos\phi - A_o A_r \sin\phi$$

and in a destructive mode.

In terms of intensity the above equations can be expressed as $$|A_0 A_r|^2 [1 - \cos\varphi \sin\varphi] = |A_0 A_r|^2 [1 - \sin 2\varphi]$$

Two subsequent frames are measured, one frame with constructive interference and other frame $$|A_0 A_r|^2 [1 + \cos\varphi \sin\varphi] = |A_0 A_r|^2 [1 + \sin 2\varphi]$$

With a destructive interference, the output from the CCD camera 721 can be connected into a qudrature electronic circuit to calculate the complex image.

This design can be modified in numerous ways to include holographic homodyne heterodyne detector (or demultiplexer). done in multi-wavelength. Or various real-time holographic combinations with two probe beams with one reference signal. Or probe signal with two reference modulations.

Most tomographic system based on using image intensifier or bragg grating as the heterodyne detector it require that two devices one mixing with sine and other mixing with cos or two successive measurement one base in mixing with sin and the other with a cos modulation.

So far the technology was described utilizing homodyne heterodyne detectors as the receiving device. This technology can be modified from homodyne technology to TDM (time division demultiplixing) technology. This modification can be understood as follows: In general any homodyne-mixing device can be modified to be a time division demultiplixing device. For such a modification, instead of the information being carried on different frequencies, the input information should be carried in different time slots and reference mixing signal should be made to switch on different time slots. Accordingly the whole technology, which was described here can be modified from homodyne heterodyne technology into a TDM technology, simply by replacing the continuous mediums modulation by pulsed mediums modulation, and utilizing the heterodyne detector as a TDM. It is also possible to perform the same experiments in different wavelength by combining TDM techniques with WDM. All periodical structures described in this invention can function as Wavelength division demultiplixers. Also in my previous invention, submitted at Aug. 19, 2000. I described tunable interferometric devices (Preferred to be Bragg grating and etalon) which can function either as WDM+TDM or WDM+FDM. Tomography with pulsed signal can be considered as subgroup of tomogrphy using TDM demultiplixing.

Regarding microscopy with enhanced sensitivity, generally speaking, in most microscopes, the light which arrived at the photodetector in scanning systems, consist of two portions: a DC portion and AC portion. The AC portion of the light is the informative portion, while the DC portion of the light is simply background illumination which is generally filtered out of the system. When the goal is to look for very small objects, the AC portion becomes almost negligible compared to the DC portion. Even though in electronic systems the DC term can be filtered out, it can cause serious reduction in the sensitivity for two reasons. (A) The DC portion of the light generates a shot noise and generation recombination noise which can be in the order of, or higher than, the signal generated by the AC portion of the light. (B) If the AC portion is very small over high back ground illumination then it is possible to reach a condition in which the detector is saturated and the AC portion is not detectable at all. Fortunately in the parallel microscopy-tomography there is a way to get rid of this background illumination before even it reaches the 2-D homodyne heterodyne detector (or demultiplexer).

Regarding the high pass filter 103 of FIG. 1, the processed 2-D signal information can be considered to contain a scattered beam component emerging from the medium/modulator 101 that is simply an image; see FIG. 8. One way to get rid of this scattered illumination is take the Fourier transform via a lens 805 and then to attenuate it or get rid of it totally. In this case when the light arrives at the 2-D homodyne heterodyne detector (or demultiplexer). 113, then the noise limit which will limit the performance of our system is the quantum noise of the detector, or the noise of the amplification system. If this DC component is not filtered out, then the sensitivity will be limited by the shot noise generated from the DC background. Electronic low-pass filtering is not as effective as optical filtering because otherwise the shot noise already generated within the system, and the small signal will be totally impeded within this noise.

In FIG. 7 the input image 803, which bears on the modulated input 801 beam, is Fourier transformed via a lens L1 805. At the focal plane there is a DC light block 807, which gets rid of the unmodulated portion of the light. After the beam passes the focal plane of the lens, it again Fourier transformed via the second lens L2 809 into the 2-D tomographic system described in FIG. 1.

Regarding back and forth propagation algorithms with acoustical microscopy, In tomography obtaining the spatial distribution of the phase and the amplitude is not sufficient for image construction of a defined plane.

Therefore, an algorithm for compensating the diffraction blur that results from the propagation is required. For this purpose the back and forth propagation algorithm should be used (10). Mathematically, the BFP algorithm is the least square estimate of the plane-of-interest between the transmitted incident-wave and the transmitted wave. Physically, BFP can be viewed as a focal plane algorithm for diffraction tomography whereby the effect of the out of focus plane is blurred (10).

In scanning microscopy, in order to construct the information in a certain plane.

The output from the scanned image should be corrected in the Fourier plane by the following transfer function.

$$H(v_x, v_y; z_1 - z_0) = \exp\left(j2\pi(z_1 - z_0)\sqrt{\frac{1}{\lambda^2} - v_x^2 - v_y^2}\right)$$

Where $v_x$, $v_y$ are the respective spatial frequencies in the Fourier plane $\lambda$ is the wave length of the acoustical signal. $Z_1$ is the z axis of the required plane and $Z_0$ is the Z axis of the sample surface. Although the results based on this approach were very good, any one familiar with Fourier processing with computer knows that it is very time consuming.

Areas of Application

In the previous sections the general systems to perform parallel microscopy and tomography were discussed. It was also pointed out where most forms of microscopies and tomographic applications in these system can be utilized. The common feature among all of these applications is that a modulate wave front enters the systems. However, the generation of the modulated beam varies and depends on the form of microscopies. For example in Photon density tomography usually an amplitude modulate laser beam is transmitted through a diffusive medium to generate a photon density wave M. A. O'Leary, D. A. Boas. B Chance and A. G. Yodh, "*Refractive of Diffuse Photon Density Waves,*". *Physical review letters,* 69, 2658–2661 (1992). A. Knuttel, J. M. Schmitt, R. Barnes and J. R. Knutson. "*Acousto-optics scanning and interfering photon density waves for precise localization of absorbing (or flourescent) body in Turbid medium,*". *Rev. Sci. Instrum.* 64, 638–643 (1993). (46) Arjun Yodh and Britton Chance "*Spectroscopy and Imaging within Diffusive Light,*"

In Doppler tomography usually an acoustic signal is launched to the medium in order to generate the Doppler shift of the light transmitted through the diffusive medium. Zhongping Ceng, Thomas E. Miller, Digant Dave and J. Stuart Nelson, "*Optical Doppler tomographic imaging of fluid velocity in highly scattering media,*" *Opt. Letts,* 22,64–67 (1997)) In Ultrasonic tomography and scanning laser acoustical microscope SLAM usually the acoustical signal is launched to the medium, the transmited acoustical signal oscillates a membrane (coverslip), the membrane is probed via a laser beam N. Chubachi, J. Kushibiki, T. Sannomiya and N. Akashi, in volume 16 *on acoustical imaging* edited by Lawrence W. Kessler Pages 277–285, J. E. Semmens and L. W. Kessler, "*Image analysis as an aid in quantitative interpretation of acoustic images of die attach,*" Volume 16 *acoustical imaging* page 129–136, C. W. Boehning and W. D. Tuohig, "*Characteristic effect in Mn—Zn Ferrites by scanning acoustical microscopy (SLAM) Volume* 16 b in *acoustical microscopy* page 137–146. Edited by Lawrence W. Kessler). In Photothemal tomography the modulated infrared laser beam is incident simultaneously with the probe beam into the medium The modulated infrared beam generatess a heat wave within the medium. This heat wave changes the index of modulation of the material as well as bends the surface of the material. These changes in the index of modulation and the surface modulates the probe beam accordingly *Photothermal investigation of solid and fluids* Edited by Jeffry A. Sell. Academic press, Inc 1989 Chapters 1, 2, 3. Pages 1–126.

In Surface microscopy and profilometry usually a modulate beam is incident on that material surface, or an unmodulate beam is incident on a vibrated medium. In both cases the reflected (or transmitted) beam is modulated according to grain sizes and roughness of the surface C. C. Huang, "*Optical heterodyne profilemeter,*" Opt. Eng. 23, 365–370 (1984) H. J. Matthews, D. K. Hamilton, and C. Sheppard, "*Surface profiling by phase-locked interferometry,*" Appl. Opt, 25, 2372–2374 (1986) (56) T. Suzuki, O. Sasaki, K. Higuchi and T Maruyama, "*Phase-locked laser diode interferometer: High-speed feedback control system,*" Appl. Opt. 30, 3623–3226, In Atomic Force Microscopy sharp tip (cantilevers) microfabricated from silicon of silicon nitride, is rasted across the surface sample using X and Y piezoelectric transducer. An AC electrical field is applied on both the tip and the sample. This causes the sharp tip (cantilevers) to oscillate accordingly to the force produced between the sample and (cantilevers). The cantilevers are probed via a laser beam. The deviation of the beam from it direction is measured via a deflection sensor (Knife edge followed by detector), and then followed by a standard homodyne heterodyne detection approaches to analyze the topology of the sample. For the purpose of parallel microscopy I recommend that the cantilevers be replaced by a condutive membrane G. Binning and H Rohrer, *Helvetica physics acta* 55, 103 (1982), (61) G. Binning and C. F. Quate and C. Gerber, *Phy review Letts,* 56, 930 (1986)(62) Scanning probe microscopy for testing ultrafast electronic devices A. S. Hou, B. A. Nechay, F. Ho D. M Bloom, *optical quantum electronics,* 28, (819–814) 1996.

I claim:

1. Image processing apparatus comprising:
   (a) modulation means for modulating an input image passing through a medium and applying the resulting broad non-focused modulated aberrated image signal emerging from the modulation means to a high pass optical filtering means for removing a DC light component to reduce quantum noise and thus improve detection of small image features;
   (b) image magnification means for magnifying said broad non-focused modulated aberrated image signal emerging from said high pass optical filtering means to produce a magnified aberrated image signal;
   (c) a two-dimensional image demultiplexer means for detecting said magnified aberrated image signal;
   (d) calculating means coupled to said two-dimensional image demultiplexer means for calculating separate phase image signals and amplitude image signals;
   (e) mixing means for mixing the separate phase image signals and amplitude image signals; and
   (f) display means coupled to an output of said mixing means for displaying images having both phase and amplitude information.

2. The image processing apparatus of claim 1 including zoom lens means coupled between said image magnification means and said two-dimensional dimensional image demultiplexer means for producing a focused aberrated image signal.

3. The image processing apparatus of claim 1 including Fourier optics filtering means, coupled between said image magnification means and said two-dimensional image demultiplexer means, having a deconvolving modulator for deconvolving the aberrated image signal from distortion caused by turbulence due to propagation of the image through said medium or from optical system aberrations.

4. The image processing apparatus of claim 1 including Fourier optics filtering means coupled between said image magnification means and said two-dimensional image demultiplexer means, said Fourier transform filtering means includes deconvolving modulation means employing a back propagation algorithm for deconvolving the aberrated image signal from distortion caused by turbulence due to propagation of the image through said medium or from optical system aberrations.

5. The image processing apparatus of claim 2 including Fourier optics filtering means, coupled between said image magnification means and said two-dimensional image demultiplexer means, having a deconvolving modulator for deconvolving the aberrated image signal from distortion caused by turbulence due to propagation of the image through said medium or from optical system aberrations.

6. The image processing apparatus of claim 2 including Fourier optics filtering means coupled between said image magnification means and said two-dimensional image demultiplexer means, said Fourier transform filtering means includes deconvolving modulation means employing a back propagation algorithm for deconvolving the aberrated image signal from distortion caused by turbulence due to propagation of the image through said medium or from optical system aberrations.

7. The image processing apparatus of claim 1 including deflection sensitive detector means coupled between said image magnification means and said two-dimensional image demultiplexer means for sensing variations of the angular paths of wavefront beamlets of the aberrated image signal.

8. The image processing apparatus of claim 2 including deflection sensitive detector means coupled between said image magnification means and said two-dimensional image demultiplexer means for sensing variations of angular paths of wavefront beamlets of the aberrated image signal.

9. The image processing apparatus of claim 3 including deflection sensitive detector means coupled between said image magnification means and said two-dimensional image demultiplexer means for sensing variations of angular paths of wavefront beamlets of the aberrated image signal.

10. The image processing apparatus of claim 4 including deflection sensitive detector means coupled between said image magnification means and said two-dimensional image demultiplexer means for sensing variations of angular paths of wavefront beamlets of the aberrated image signal.

11. The image processing apparatus of claim 1 wherein said high pass optical filtering means comprises a Fourier transform lens optically coupled to a DC light blocking member for removing DC background illumination.

12. The image processing apparatus of claim 2 wherein said high pass optical filtering means comprises a Fourier transform lens optically coupled to a DC light blocking member for removing DC background illumination.

13. The image processing apparatus of claim 3 wherein said high pass optical filtering means comprises a Fourier transform lens optically coupled to a DC light blocking member for removing DC background illumination.

14. The image processing apparatus of claim 1 wherein said image magnification means includes a feedback magnification loop.

15. The image processing apparatus of claim 2 wherein said image magnification means includes a feedback magnification loop.

16. The image processing apparatus of claim 7 wherein said deflection sensitive detector means includes a periodical structure.

17. The image processing apparatus of claim 8 wherein said deflection sensitive detector means includes a periodical structure.

18. The image processing apparatus of claim 9 wherein said deflection sensitive detector means includes a periodical structure.

19. The image processing apparatus of claim 1 wherein said calculating means employs a quadrature circuit for calculating both the phase and amplitude image signals.

20. The image processing apparatus of claim 1 wherein said two-dimensional image demultiplexer means comprises a homodyne heterodyne detector.

21. The image processing apparatus of claim 20 wherein said calculating means employs a quadrature circuit for calculating both the phase and amplitude image signals.

22. The combination as set forth claim 1 wherein said two-dimensional image demultiplexer means comprises a tunable Bragg filter.

23. The combination as set forth claim 1 wherein said two-dimensional image demultiplexer means comprises an image intensifier with external gain modulation.

24. The combination as set forth claim 1 wherein said two-dimensional image demultiplexer means comprises a CCD array.

25. The combination as set forth claim 1 wherein said two-dimensional image demultiplexer means comprises a holographic demultiplexer employing wave mixing.

26. Image processing apparatus comprising:
(a) modulation means for modulating an input image of an object produced by illumination with a plane wave directed at an aberrating medium associated with the input image, and applying the resulting broad non-focused modulated aberrated image signal emerging from the modulation means to a high pass optical filtering means for removing unmodulated portions of light to reduce quantum noise and thus improve detection of small image features;
(b) image magnification means for magnifying said broad non-focused modulated aberrated image signal emerging from said high pass optical filtering means to produce a magnified aberrated image signal;
(c) a two-dimensional image demultiplexer means for detecting said magnified aberrated image signal;
(d) zoom lens means coupled between said image magnification means and said two-dimensional image demultiplexer means for producing a focused aberrated image signal;
(e) calculating means coupled to said two-dimensional image demultiplexer means for calculating separate phase image signals and amplitude image signals;
(f) mixing means for mixing the separate phase image signals and amplitude image signals produced by said calculating means; and
(g) display means coupled to an output of said mixing means for displaying images having both phase and amplitude information.

27. The image processing apparatus of claim 26 wherein said calculating means employs a quadrature circuit for calculating both the phase and amplitude image signals.

28. The image processing apparatus of claim 26 wherein said a two-dimensional image demultiplexer means comprises a homodyne heterodyne image detector means.

29. The combination as set forth claim 26 wherein said two-dimensional image demultiplexer means comprises a tunable Bragg filter.

30. The combination as set forth claim 26 wherein said two-dimensional image demultiplexer means comprises an image intensifier with external gain modulation.

31. The combination as set forth claim 26 wherein said two-dimensional image demultiplexer means comprises a CCD array.

32. The combination as set forth claim 26 wherein said two-dimensional image demultiplexer means comprises a holographic demultiplexer employing wave mixing.

33. Image processing apparatus comprising:
(a) modulation means for modulating an input image passing through an aberrating medium and applying the resulting broad non-focused modulated aberrated image signal emerging from the modulation means to a high pass optical filtering means for removing a DC light component to reduce quantum noise and thus improve detection of small image features;
(b) image magnification means for magnifying said broad non-focused modulated aberrated image signal emerging from said high pass optical filtering means to produce a magnified aberrated image signal;
(c) a two-dimensional image demultiplexer means for detecting said magnified aberrated image signal;
(d) calculating means coupled to said two-dimensional image demultiplexer means for calculating separate phase image signals and amplitude image signals;
(e) mixing means for mixing the separate phase image signals and amplitude image signals;
(f) display means coupled to an output of said mixing means for displaying images having both phase and amplitude information;
(g) zoom lens means coupled between said image magnification means and said two-dimensional image demultiplexer means for producing a focused aberrated image signal;
(h) Fourier optics filtering means coupled between said zoom lens means and said two-dimensional image demultiplexer means, said Fourier transform filtering means includes deconvolving modulation means employing a back propagation algorithm for deconvolving the aberrated image signal from distortion caused by turbulence due to propagation of the image through said medium or from optical system aberrations; and
(i) deflection sensitive detector means coupled between said Fourier optics filtering means and said two-dimensional image demultiplexer means for sensing variations of the angular paths of wavefront beamlets of the aberrated image signal.

34. The combination as set forth claim 1 wherein said two-dimensional image demultiplexer means comprises a tunable Bragg filter functioning simultaneously as a deflection sensor.

35. The image processing apparatus of claim 4 wherein said back propagation algorithm for deconvolving the aberrated image signal from distortion is of the encoded form of following transfer function $$H(v_x, v_y; z_1 - z_0) = \exp\left(j2\pi(z_1 - z_0)\sqrt{\frac{1}{\lambda^2} - v_x^2 - v_y^2}\right)$$

where $v_x$, $v_y$, are the respective spatial frequencies in the Fourier plane $\lambda$ is the wave length of the acoustical signal, $Z_1$ is the z axis of the required plane and $Z_0$ is the Z axis of the sample surface.

36. The image processing apparatus of claim 6 wherein said back propagation algorithm for deconvolving the aberrated image signal from distortion is of the encoded form of following transfer function $$H(v_x, v_y; z_1 - z_0) = \exp\left(j2\pi(z_1 - z_0)\sqrt{\frac{1}{\lambda^2} - v_x^2 - v_y^2}\right)$$

$$H(v_x, v_y; z_1 - z_0) = \exp\left(j2\pi(z_1 - z_0)\sqrt{\frac{1}{\lambda^2} - v_x^2 - v_y^2}\right)$$

where $v_x$, $v_y$ are the respective spatial frequencies in the Fourier plane $\lambda$ is the wave length of the acoustical signal, $Z_1$ is the z axis of the required plane and $Z_0$ is the Z axis of the sample surface.

37. The image processing apparatus of claim 33 wherein said back propagation algorithm for deconvolving the aberrated image signal from distortion is of the encoded form of following transfer function $$H(v_x, v_y; z_1 - z_0) = \exp\left(j2\pi(z_1 - z_0)\sqrt{\frac{1}{\lambda^2} - v_x^2 - v_y^2}\right)$$

where $v_x$, $v_y$ are the respective spatial frequencies in the Fourier plane $\lambda$ is the wave length of the acoustical signal, $Z_1$ is the z axis of the required plane and $Z_0$ is the Z axis of the sample surface.

* * * * *